United States Patent
Mizuno et al.

(10) Patent No.: US 9,255,561 B2
(45) Date of Patent: Feb. 9, 2016

(54) ENGINE STARTING DEVICE

(75) Inventors: Daisuke Mizuno, Tokyo (JP); Haruhiko Shimoji, Tokyo (JP); Koichiro Kamei, Tokyo (JP); Masami Abe, Tokyo (JP); Kazuhiro Odahara, Tokyo (JP); Hiroaki Kitano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 298 days.

(21) Appl. No.: 13/977,888

(22) PCT Filed: Dec. 6, 2011

(86) PCT No.: PCT/JP2011/078170
§ 371 (c)(1),
(2), (4) Date: Jul. 1, 2013

(87) PCT Pub. No.: WO2012/132120
PCT Pub. Date: Oct. 4, 2012

(65) Prior Publication Data
US 2013/0276578 A1    Oct. 24, 2013

(30) Foreign Application Priority Data
Mar. 29, 2011    (JP) .................... 2011 071669

(51) Int. Cl.
*F02N 11/08*    (2006.01)
*F02N 15/06*    (2006.01)

(52) U.S. Cl.
CPC .......... *F02N 11/0851* (2013.01); *F02N 11/087* (2013.01); *F02N 11/0844* (2013.01); *F02N 11/0855* (2013.01); *F02N 15/06* (2013.01); *Y02T 10/48* (2013.01); *Y10T 74/132* (2015.01)

(58) Field of Classification Search
CPC .............. F02N 11/0851; F02N 11/087; F02N 11/0855; F02N 11/0844; Y02T 10/48

USPC .................. 123/179.3, 179.4, 179.25, 179.28
See application file for complete search history.

(56) References Cited

U.S. PATENT DOCUMENTS

| 5,731,638 A | 3/1998 | Niimi |
| 8,985,080 B2 * | 3/2015 | Murata et al. .............. 123/179.4 |

(Continued)

FOREIGN PATENT DOCUMENTS

| DE | 102004054367 A1 | 6/2005 |
| DE | 102008040830 A1 | 2/2010 |

(Continued)

OTHER PUBLICATIONS

Japanese Office Action (Preliminary Notice of Reasons for Rejection) mailed Jun. 3, 2014, Patent Application No. 2013-507057.

(Continued)

*Primary Examiner* — Hai Huynh
(74) *Attorney, Agent, or Firm* — Sughrue Mion, PLLC

(57) ABSTRACT

The engine starting device includes a starter motor, a pinion portion, a pushing mechanism for pushing a pinion gear of the pinion portion to a position at which the pinion gear comes into meshing engagement with a ring gear, and an integrated switch for operating a motor-energization switch to pull a plunger after the pinion gear is pushed, by configuring a switch for actuating the pushing mechanism and turning ON/OFF an energization current to the starter motor by a single plunger coil. When a restart request is issued after an engine stop is requested and therefore the integrated switch is placed in an ON state, operation timing of the pushing mechanism and coil-operation timing of the plunger coil are set so that the starter motor avoids operating until the pinion gear comes into contact or meshing engagement with the ring gear.

8 Claims, 12 Drawing Sheets

(56) References Cited

U.S. PATENT DOCUMENTS

| | | |
|---|---|---|
| 2005/0099009 A1 | 5/2005 | Spellman et al. |
| 2010/0033066 A1 | 2/2010 | Murata et al. |
| 2010/0299053 A1 | 11/2010 | Okumoto et al. |
| 2011/0174255 A1 | 7/2011 | Neuburger et al. |

FOREIGN PATENT DOCUMENTS

| | | |
|---|---|---|
| DE | 102008054965 A1 | 7/2010 |
| JP | 2000-274336 A | 10/2000 |
| JP | 2000-274337 A | 10/2000 |
| JP | 2002-070699 A | 3/2002 |
| JP | 2002-303236 A | 10/2002 |
| JP | 4211208 B2 | 1/2009 |
| JP | 2010-84754 A | 4/2010 |
| JP | 2010-144554 A | 7/2010 |
| JP | 4553070 B1 | 9/2010 |
| JP | 2010-236533 A | 10/2010 |
| JP | 2010-255523 A | 11/2010 |
| JP | 2010-270674 A | 12/2010 |
| JP | 4645771 B1 | 3/2011 |
| JP | 2012-512981 A | 6/2012 |
| WO | 2010-069645 A1 | 6/2010 |
| WO | 2010/069645 A1 | 6/2010 |
| WO | 2010-069646 A1 | 6/2010 |
| WO | 2011/024511 A1 | 3/2011 |

OTHER PUBLICATIONS

Japanese Office Action (Preliminary Notice of Reasons for Rejection) dated Mar. 11, 2014, Patent Application No. 2013-507057.
Communication dated May 28, 2015 from the German Patent Office in counterpart application No. 112011105103.4.

* cited by examiner

TIME

TIME

ENGINE STARTING DEVICE

CROSS REFERENCE TO RELATED APPLICATIONS

This application is a National Stage of International Application No. PCT/JP2011/078170, filed on Dec. 6, 2011, which claims priority from Japanese Patent Application No. 2011-071699, filed on Mar. 29, 2011, the contents of all of which are incorporated herein by reference in their entirety.

TECHNICAL FIELD

The present invention relates to an engine starting device in an idle-stop system of a vehicle.

BACKGROUND ART

In the inventions relating to a conventional idle-stop system, restart is performed by bringing a pinion gear of a starter and a ring gear into meshing engagement with each other during rotation of an engine in order to improve restartability after an engine stop operation is performed. For example, the rotation of a starter motor is started in response to a restart request for the engine. A rotation speed of the starter motor is brought into synchronization with that of the engine by energization with speed governing, thereby coupling the starter motor and the engine to each other (see Patent Literature 1, for example).

Moreover, when the engine is stopped, even in the case where the restart request is not issued, the pinion and the ring gear are being brought into meshing engagement while the engine is rotating or immediately before the engine is stopped, for preparation of the restart request which may be issued at any time (see Patent Literature 2, for example).

CITATION LITERATURE

Patent Literature

[PTL 1] JP 4211208 B
[PTL 2] JP 2010-242555 A

SUMMARY OF INVENTION

Technical Problems

In the achievement of the meshing engagement between the pinion and the ring gear during the rotation of the engine, the related art is common in control of a mechanism for rotating the pinion and timing of starting rotation of a motor to bring the gears into meshing engagement. Therefore, a mechanism for pushing the pinion and a mechanism for rotating the motor are required to be provided separately.

As a result, the number of components is increased. In addition, even in terms of control, the control is required to be strictly defined for each kind of vehicle, and hence becomes complex in spite of an effort to simplify the control. Thus, in order to bring the pinion and the ring gear into meshing engagement during rotation, cost is significantly increased.

Moreover, when the pinion and the ring gear are brought into meshing engagement during the rotation of the engine, phases of both the gears cannot be precisely known. Therefore, even when the rotation speeds are synchronized, end surfaces of the gears abut against each other to prevent successful meshing engagement. As a result, noise is generated. Further, when the rotation speed of the engine is actually lowered by inertial rotation, a speed of reduction in the rotation speed of the ring gear is higher even if the rotation speed of the starter motor is reduced by stopping the energization. Therefore, in the case where the meshing engagement is not successfully achieved when the rotation speeds are synchronized, there is a problem in that a difference between the rotation speeds becomes larger and it becomes further difficult to achieve the meshing engagement.

In order to synchronize the rotation speeds of the ring gear and the motor by rotating the motor, complex control including pinion-gear pushing control and control of the rotation of the motor is required. However, depending on timing of pushing, pushing timing shifts in some cases due to a voltage drop. Further, in order to bring the pinion and the ring gear into meshing engagement during the rotation described above, noise is generated by collision of the end surfaces unless the phases and rpms are made completely the same.

The present invention has been made to solve the problems described above, and therefore has an object to provide an engine starting device capable of restarting an engine during rotation of a ring gear even without requiring special control over a pinion gear of a starter and the ring gear, and with elimination of a relay and control for pushing the pinion gear and rotating a motor in a separate manner to reduce cost.

Solution to Problems

According to the present invention, there is provided an engine starting device for an idle-stop system for stopping an engine when an idle-stop condition is satisfied, the engine starting device including: a starter motor; a pinion portion which is to be spline-coupled to an output shaft side of the starter motor, and is slidable in an axial direction; a pushing mechanism for pushing a pinion gear of the pinion portion to a position at which the pinion gear comes into meshing engagement with a ring gear; and an integrated switch for operating a motor-energization switch to pull a plunger after the pinion gear is pushed, by configuring a switch for actuating the pushing mechanism and turning ON/OFF an energization current to the starter motor by a single plunger coil, in which: when a restart request is issued after an engine stop is requested and therefore the integrated switch is placed in an ON state, operation timing of the pushing mechanism and coil-operation timing of the plunger coil are set so that the starter motor avoids operating until the pinion gear comes into contact or meshing engagement with the ring gear; and the engine is restarted when a predetermined condition is satisfied even during inertial rotation of the engine.

Advantageous Effects of Invention

According to the present invention, when the restart request is issued after the engine stop is requested, the starting switch is turned to the ON state to push the pinion gear. At the same time, the operation of the pushing mechanism and the coil operation of the plunger coil for rotating the starter motor are set so as not to operate the starter motor until the pinion gear comes into contact with or into meshing engagement with the ring gear. Therefore, the engine starting device capable of restarting the engine during the rotation of the ring gear even without requiring the special control over the pinion gear of the starter and the ring gear, and with elimination of the relay and the control for pushing the pinion gear and rotating the motor in a separate manner to reduce cost.

DESCRIPTION OF EMBODIMENTS

Figure 1:
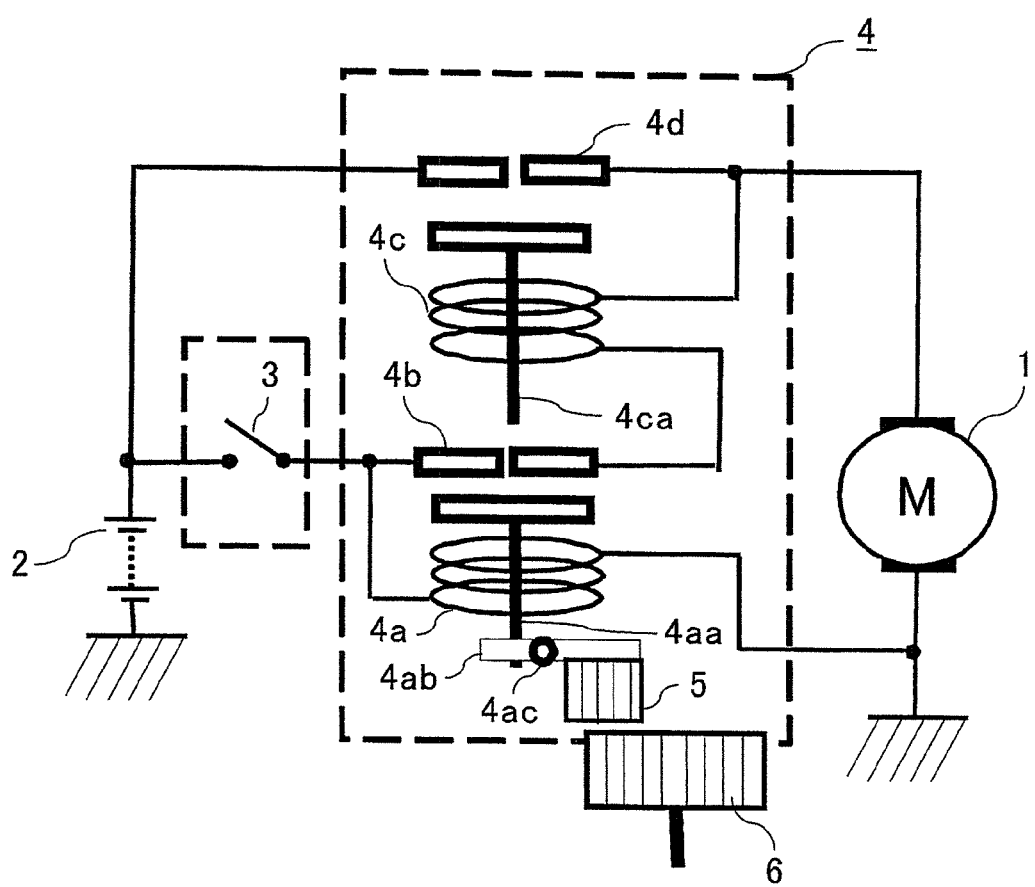
FIG. 1 A schematic view of an engine starting device according to a first embodiment of the present invention.

First, the concept of the present invention is described in light of the problems of the related art.

As described above, although noise generated by a pinion and a ring gear is suppressed in the related art, the noise cannot be suppressed completely. Moreover, the magnitude of noise greatly depends on the kind of engine and the shape of the pinion, and is present individually. Therefore, it is difficult to clearly define the magnitude of noise. Accordingly, it is difficult to represent the suppression of noise in a quantitative numerical value.

As a case where the noise does not become a problem (specifically, the noise is at an ignorable level) at the time of restart, the following case is considered. At the time of restart, an engine rpm starts increasing simultaneously after meshing engagement is achieved. Therefore, cranking noise is generated. Therefore, when meshing noise generated at the time of restart is smaller than the cranking noise, the noise is ignorable.

As a method for suppressing the meshing noise, a one-way clutch is generally mounted in a pinion portion regardless of whether or not a vehicle is an idle-stop vehicle so that no problem occurs even when a speed of rotation of the ring gear becomes higher by cranking at the time when the engine rpm starts increasing. Therefore, in the case where the pinion and the ring gear are brought into collision against each other while a motor is rotating, noise becomes greater due to an inertial force of the motor as compared with the case without the rotation of the motor even when an rpm difference between the pinion and the ring gear is the same.

Moreover, when the rpm difference is the same, a speed difference at the center between the gears is the same. However, for the collision at a portion other than the portions described above, an colliding force cannot be defined in rpm. For example, the colliding force becomes greater by rotating the motor even when the rpm difference is the same.

Therefore, until the pinion and the ring gear come into contact with each other to be brought into meshing engagement, the noise is suppressed unless the motor is not rotating. An operation with the suppression of noise is a simple operation for pushing the pinion and rotating the motor after the pinion comes into contact with the ring gear. Therefore, as compared with a conventional switch mechanism for meshing engagement during rotation, cost can be reduced.

In addition, a conventional switch configuration can be directly used for the operation described above when time from pushing of the pinion to the start of the rotation of the motor is appropriately set. Not only the switch is directly used but also the operation is performed regardless of a rotation speed. Therefore, complex tuning of control is not required. Therefore, an engine starting device having a noise level as low as a conventional one can be obtained at low cost.

Preferred embodiments of the engine starting device according to the present invention are described below referring to the drawings.

First Embodiment

FIG. 1 is a schematic diagram of an engine starting device according to a first embodiment of the present invention. The engine starting device according to the first embodiment, illustrated in FIG. 1, includes a starter motor 1, a battery 2, a starting switch 3, and a starter 4. The starter 4 includes a coil 4a, a coil core 4aa, a lever 4ab, a lever rotation center 4ac, a switching portion 4b for the coil, a coil 4c, a coil core 4ca, a motor-energization switching portion 4d, and a pinion portion 5.

Next, each of components is described.

The starter motor 1 starts an engine. The battery 2 is a power supply for supplying electric power to the starter motor 1. The starting switch 3 is a switch connected to the battery 2 to activate the starter motor 1.

The coil 4a constituting the starter 4 is connected to a ground terminal of the starter motor 1 and the starting switch 3. The lever 4ab is rotated about the rotation center 4ac by movement of the coil core 4aa of the coil 4a to push the pinion portion 5 toward a ring gear 6.

With the movement of the pinion portion 5, the switching portion 4b is connected. As a result, the coil 4c is connected to the battery 2 through an intermediation of the starting switch 3. Further, the motor-energization switching portion 4d is connected by movement of the core 4ca of the coil 4c.

In the engine starting device having the configuration described above, the starting switch 3 is closed in response to an engine start request. As a result, the driving coil 4a is excited from the battery 2 through the starting switch 3. In this manner, the core 4aa is operated to push the pinion portion 5 against the ring gear 6, while the switching portion 4b of the coil is connected.

By the connection of the switching portion 4b of the coil, the coil 4c is excited to connect the motor-energization switching portion 4d. Further, by the connection of the motor-energization switching portion 4d, a current is supplied to the starter motor 1 to start rotating the starter motor 1.

Coil operations of the coils 4a and 4c are set so that operation time of the pinion portion 5 enables the pinion portion 5 to be reliably pushed against the ring gear 6 or to come contact therewith before the starter motor 1 starts rotating. Specifically, when the start is performed so as to bring a pinion gear and the ring gear 6 into meshing engagement in response to the engine restart request, the coil operations are set so that the pinion reliably comes into contact with the ring gear 6 without rotating.

Figure 2:
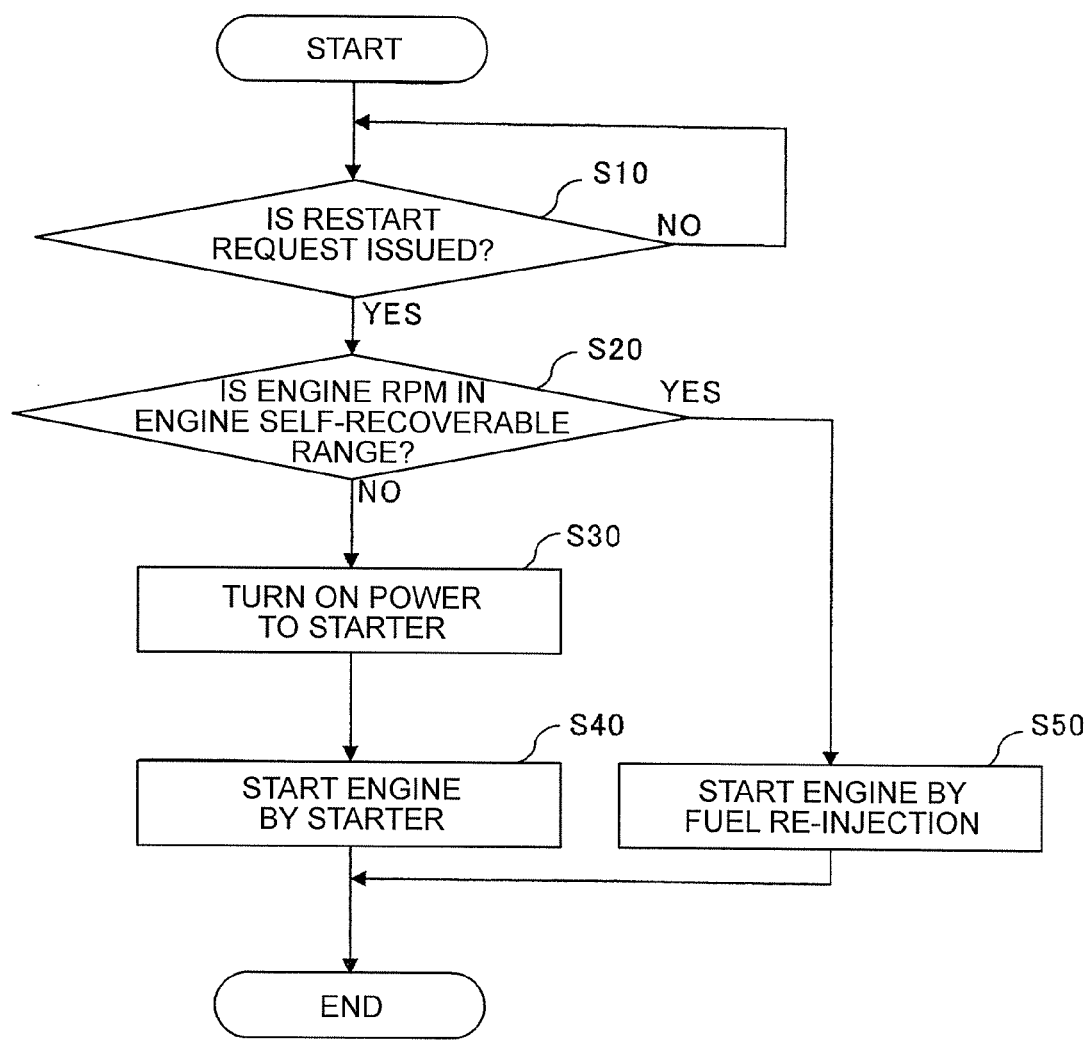
FIG. 2 A flowchart illustrating an operation series of the engine starting device according to the first embodiment of the present invention.
Figure 3:
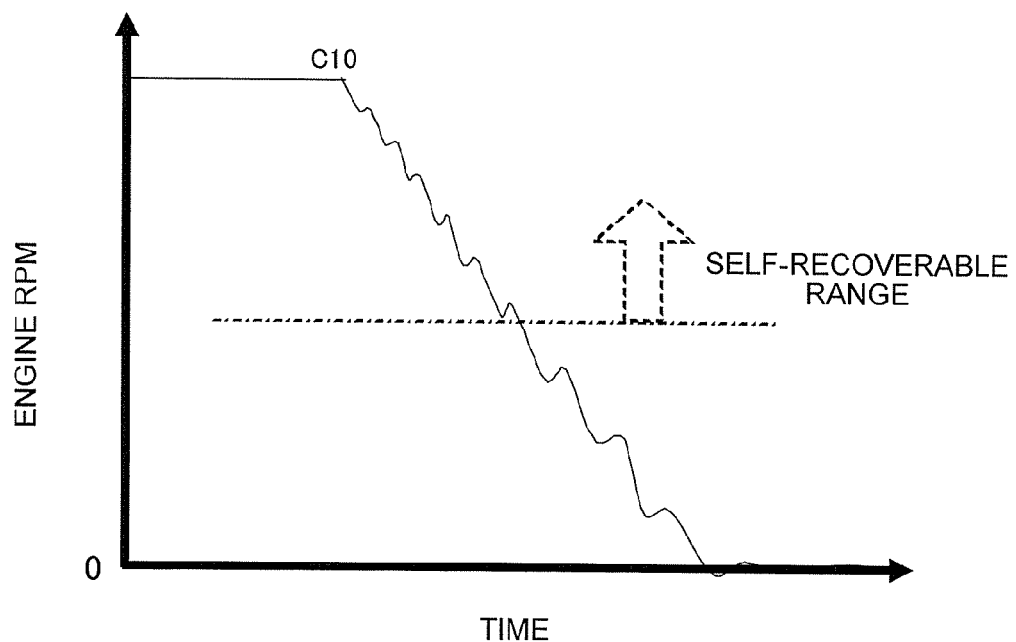
FIG. 3 A graph showing a state in which an engine rpm is decreasing after a stop operation, with the engine starting device according to the first embodiment of the present invention.

By using the engine starting device described above, an operation performed by a control section (not shown) included in the engine starting device when the restart request based on idle stop is issued is described referring to the drawings. FIG. 2 is a flowchart illustrating an operation series of the engine starting device according to the first embodiment of the present invention. FIG. 3 is a graph showing a state in which an engine rpm is decreasing after a stop operation is performed, with the engine starting device according to the first embodiment of the present invention.

After the stop operation is performed, the engine decelerates with pulsations as indicated by C10 shown in FIG. 3. Therefore, when engine rotation starts decelerating by inertial rotation after idling is stopped, the control section is always in wait for a restart request (Step S10). Then, when the restart request is issued, ring-gear rotation-speed detecting means (not shown) for detecting a rotation speed of the ring gear (specifically, corresponding to the engine rpm) determines whether or not the engine rpm is in a self-recoverable range (see FIG. 3) (Step S20). When the engine rpm is in the self-recoverable range, the control section re-injects a fuel to start the engine (Step S50). Then, the operation series is terminated.

On the other hand, when the engine rpm is not in the self-recoverable range, the control section turns ON power to the starter 4 so that the engine is restarted by the starter 4 (Steps S30 and S40).

In the first embodiment, when the engine rpm is not in the self-recoverable region and the restart request is issued after the stop operation is performed, the starting switch 3 of the starter 4 is turned ON regardless of the rpm to perform the restart by the starter motor 1. As a result, the pinion and the ring gear come into contact with or meshing engagement with each other to restart the engine.

At the time of meshing engagement between the pinion and the ring gear, when the pinion is pushed to come into contact with the ring gear after the starting switch 3 is turned ON, any rpm difference is generated. At this time, the rotation of the starter motor 1 is not started yet. Therefore, even if a noise value becomes somewhat larger due to the presence of the rpm difference than a noise value when the pinion is rotated by the starter motor 1 to synchronize the rotation speeds to bring the pinion gear into meshing engagement with the ring gear, a rise in noise level is not harmful. This rise in noise level is described referring to FIG. 4.

Figure 4:
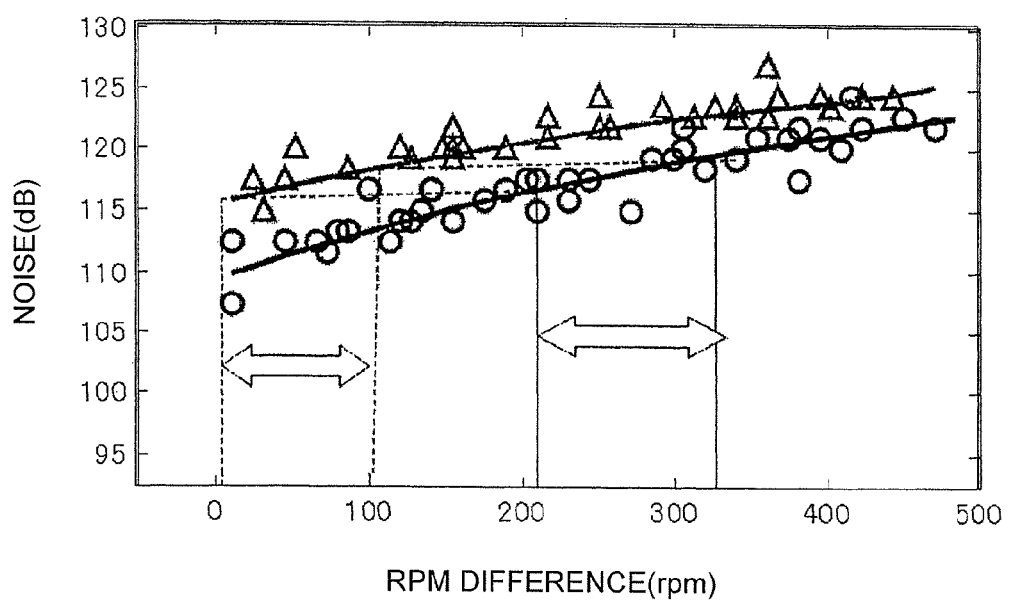
FIG. 4 A graph showing the relationship between an rpm difference and noise, with the engine starting device according to the first embodiment of the present invention.

FIG. 4 is a graph showing the relationship between the rpm difference and the noise, with the engine starting device according to the first embodiment of the present invention. Specifically, FIG. 4 is a graph for comparing peak values of noise (corresponding to triangles shown in FIG. 4) when the contact is achieved with the rotation of the motor and peak values of noise (corresponding to circles shown in FIG. 4) when the contact is achieved without the rotation of the motor, with respect to the rpm difference. As can be seen from FIG. 4, the noise is suppressed in the starter motor 1 without the rotation even with the same rpm difference, although an absolute value differs depending on specifications of the pinion and the ring gear.

In the case where the starter motor 1 is rotated, even when the same speed difference is set on center lines of the ring gear and the pinion gear, the speeds become different at portions other than on the center lines due to the rotation of the pinion gear. As a result, the speed difference becomes a shock. Moreover, as a result of the rotation, the noise is increased even by inertia of the motor.

Therefore, even when the starter motor 1 is not rotated, the meshing engagement can be achieved with a noise which is low to some extent. When the low noise is lower than cranking noise, a driver does not feel discomfort with no problem.

Figure 5:
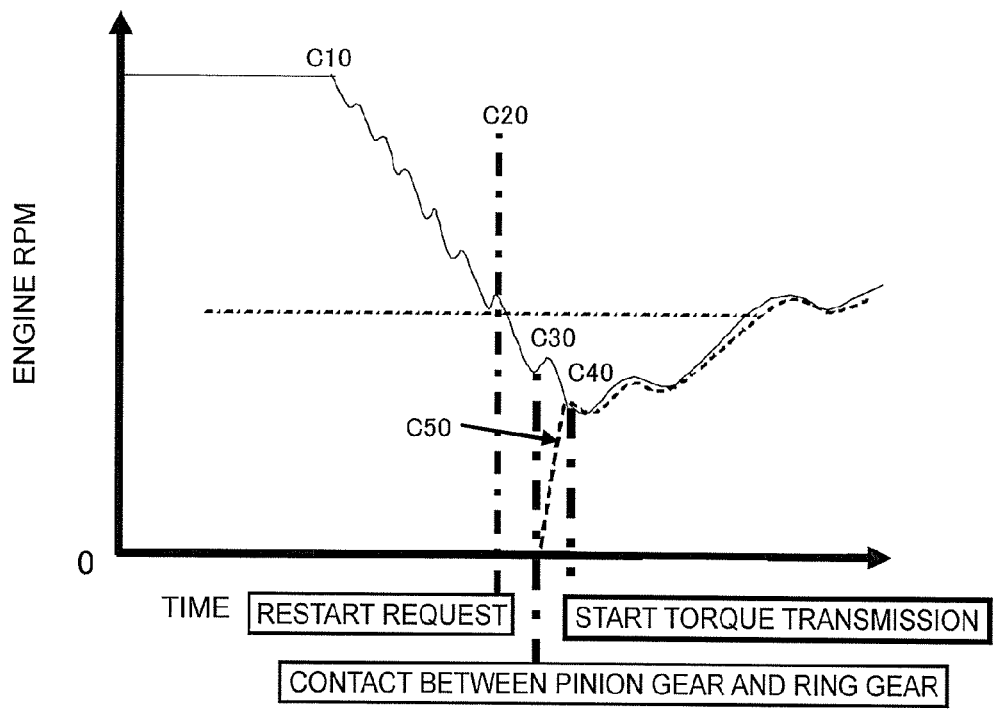
FIG. 5 A graph showing a state of the engine rpm when meshing engagement is carried out by restart after the engine rpm decreases subsequently to the stop operation, with the engine starting device according to the first embodiment of the present invention.

FIG. 5 is a graph showing a state of the engine rpm when the meshing engagement is carried out by restarting the engine after the engine rpm decreases subsequently to the stop operation, with the engine starting device according to the first embodiment of the present invention. The engine rpm decreases with pulsations, as indicated by C10. Thereafter, when the engine restart request is issued at C20, the engine rpm is equal to or smaller than a self-recoverable rpm. The coil 4a is energized to push the pinion. As a result, the pinion and the ring gear come into contact with each other at C30.

Setting is performed so that the starter motor 1 starts rotating, for example, 40 msec after timing of pushing the pinion, by a switch configured to have a dimensional relationship which allows the starter motor 1 to start rotating at timing after the contact is achieved at C30. Then, at C40 at which the engine rpm and a motor rpm become equal to each other, the starter motor 1 transmits a torque to start the engine. A behavior of an rpm of the pinion gear (corresponding to the engine rpm) is indicated by C50.

A loss in engine-rpm increase time between C30 and C40 is generated by not rotating the starter motor 1 in the operations described above. However, time of the loss is short and therefore, is at an ignorable level. The engine starting device configured as described above is obtained at low cost and enables the operation without providing discomfort resulting from restart time and noise.

As described above, according to the first embodiment, when the restart request is issued after the engine stop is requested, the starting switch is turned to the ON state. In this manner, the operation of the pushing mechanism and the coil operation of the plunger coil for rotating the starter motor are set so that the pinion gear is pushed and the starter motor is not operated until the pinion gear comes into contact with or comes into meshing engagement with the ring gear. As a result, there can be provided the engine starting device which does not require special control over the pinion gear of the starter and the ring gear, eliminates a relay and control for pushing the pinion gear and rotating the starter motor in a separate manner so as to reduce cost, and is capable of restarting the engine during the rotation of the ring gear.

Second Embodiment

A peak value of the noise generated by the collision greatly differs depending on the shape of the pinion gear of the pinion portion. It is difficult to indicate definite references of the noise-value level and the rpm difference. Therefore, the shape of the pinion portion becomes important. Moreover, when the pinion and the ring gear have an rpm difference, not only the problem of the peak value of the collision noise but also a problem of a meshing loss is caused because the pinion gear and the ring gear scratch each other in the contact state. Moreover, depending on time of the meshing loss, discomfort in perception of the noise is generated. Thus, a configuration for avoiding the problems described above is described in the second embodiment.

An overall configuration including the switch is the same as that of the first embodiment described above, illustrated in FIG. 1. For the pinion portion 5, a specific example using a pinion for synchronization for meshing engagement is described below.

Figure 6:
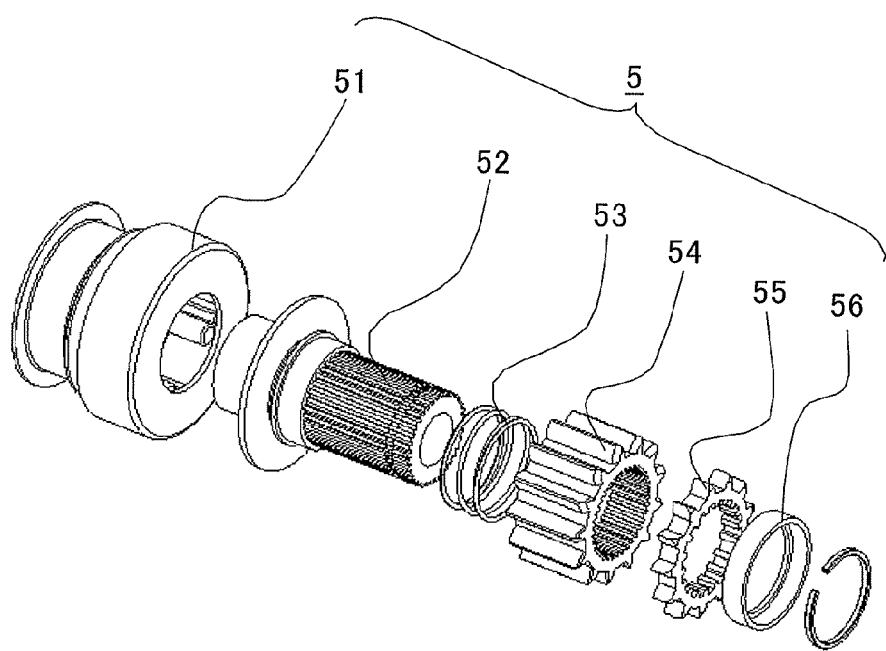
FIG. 6 A configuration diagram illustrating a pinion portion according to a second embodiment of the present invention.

FIG. 6 is a configuration diagram of the pinion portion 5 according to a second embodiment of the present invention. The pinion portion 5 according to the second embodiment illustrated in FIG. 6 includes a one-way clutch 51, a shaft core 52, a spring 53, a pinion gear 54 for torque transmission, a pinion gear 55 exclusive for synchronization, and a stopper 56.

The pinion gear 55 exclusive for synchronization for meshing engagement and the torque-transmission pinion gear 54 after the achievement of meshing engagement as illustrated in FIG. 6 are provided as pinion gears included in the pinion portion 5, and can move in an axial direction by the spring. The pinion portion 5 further includes the one-way clutch 51 and has a mechanism spinning in a direction in which the ring gear rotates at a high speed.

Figure 7:
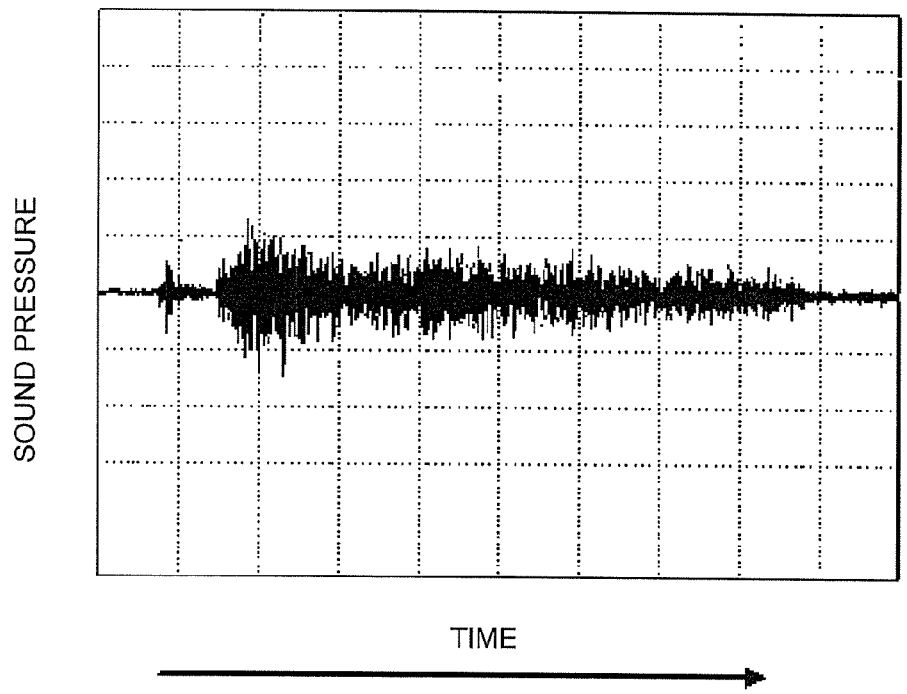
FIG. 7 A graph showing a sound-pressure waveform when meshing time is long.
Figure 8:
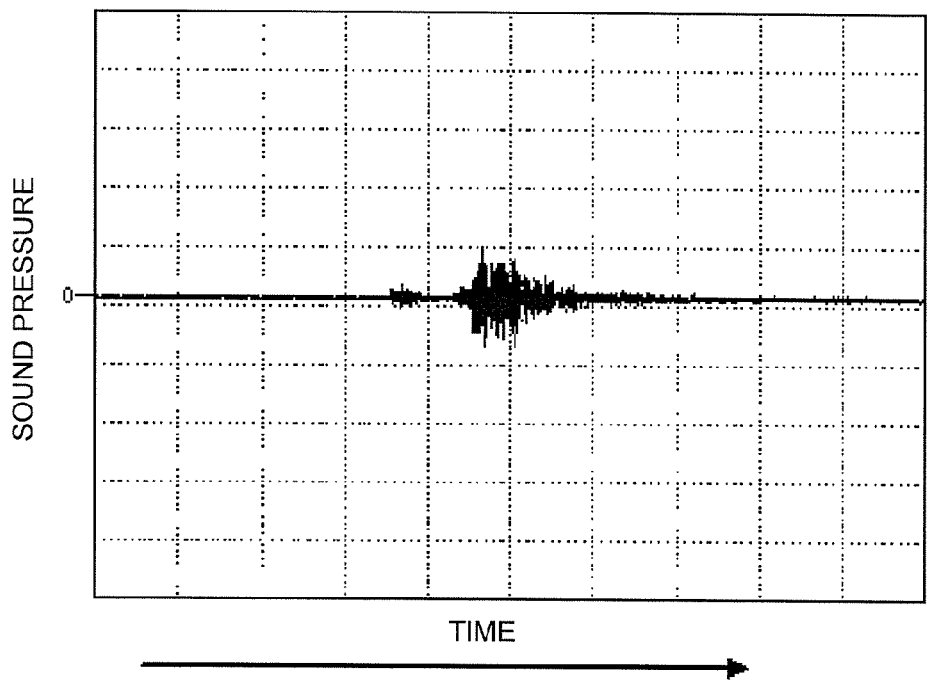
FIG. 8 A graph showing the sound-pressure waveform with the engine starting device according to the second embodiment of the present invention.

FIG. 7 is a graph showing a sound-pressure waveform when the meshing time is long. FIG. 8 is a graph showing a sound-pressure waveform, with the engine starting device according to the second embodiment of the present invention. When the rpms of the pinion and the ring gear are equal to or larger than a certain rpm, the pinion and the ring gear are placed in a scratched state for long time until the rpm difference becomes a predetermined rpm difference.

The peak value of the noise is determined by the collision in an early phase. The prolonged meshing time as described above gives an impression that the noise becomes greater, giving discomfort. When the rpm difference becomes larger, the tendency becomes stronger. On the other hand, in the second embodiment, as illustrated in FIG. 6 referred to above, by using the pinion portion 5 including the pinion gear 55 exclusive for synchronization for meshing engagement, the situation described above can be avoided. As a result, the meshing engagement can be achieved promptly, as illustrated in FIG. 8. As a result, the problem of discomfort due to the prolonged meshing time can be eliminated.

The pinion portion 5 can be used without any problem even if there is the rpm difference at the level as high as 500 rpm. Therefore, by using the pinion portion 5 having the structure illustrated in FIG. 6, the engine starting device capable of restarting the engine at low cost even by using an integrated switch can be realized with the same control as that of the first embodiment described above. Further, the pinion portion 5 described above also has the effect of lowering the noise peak value as shown in FIG. 8. Therefore, both the peak value of the meshing noise and the meshing time can be suppressed. As a result, a more comfortable engine starting device can be realized.

As described above, according to the second embodiment, besides the effects of the first embodiment described above, the meshing time can be shortened by using the pinion portion including the pinion gear exclusive for the synchronization for meshing engagement. Therefore, a further reduction in noise can be realized.

Figure 9:
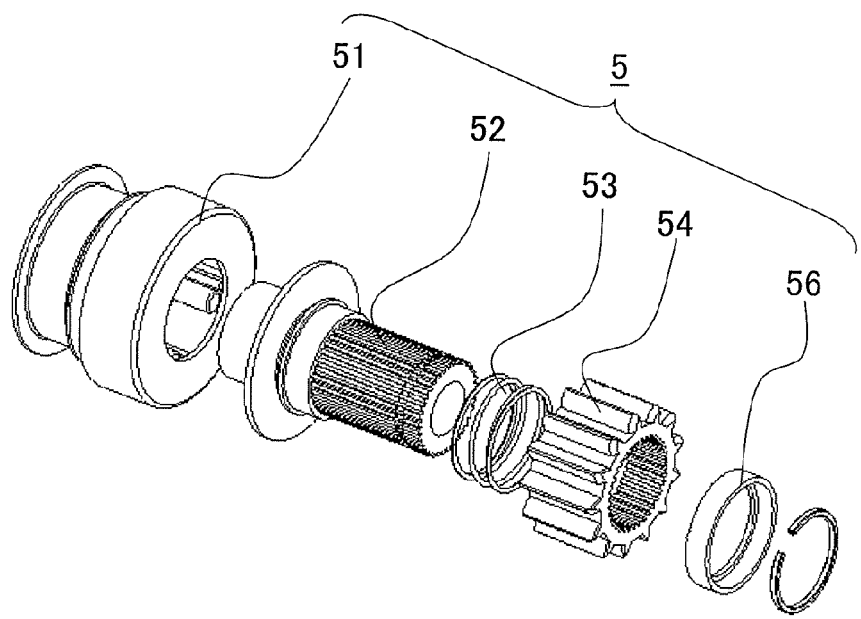
FIG. 9 Another configuration diagram illustrating the pinion portion according to the second embodiment of the present invention.

The gear for synchronization is not limited to the type described above. FIG. 9 is another configuration diagram of the pinion portion 5 according to the second embodiment of the present invention. As illustrated in FIG. 9, a pinion gear itself is one body as indicated by the reference numeral 54. However, by designing the shape of a distal end portion of the pinion gear 54, the pinion gear can function as a gear for synchronization.

Figure 10:
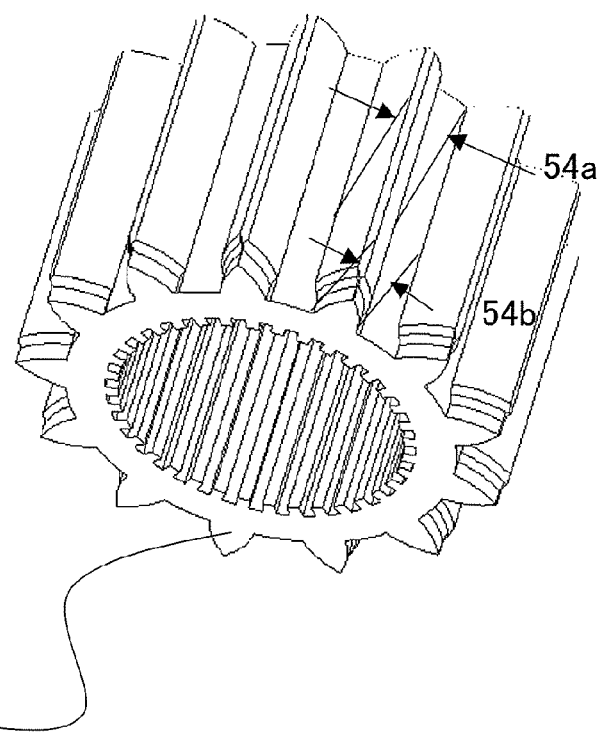
FIG. 10 An explanatory diagram for a specific shape of a distal end portion of a pinion gear illustrated in FIG. 9 according to the second embodiment of the present invention.
Figure 11:
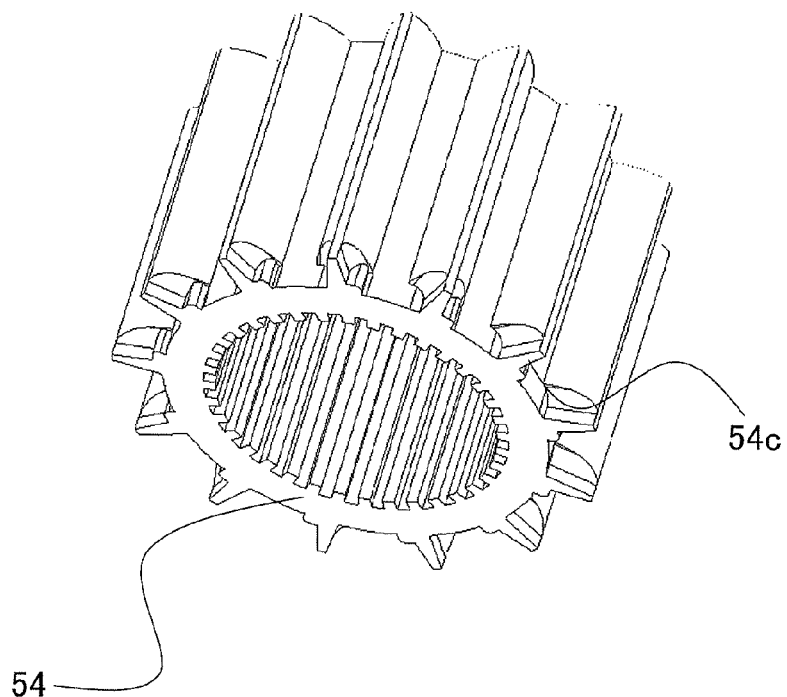
FIG. 11 An explanatory view for the specific shape of the distal end portion of the pinion gear illustrated in FIG. 9 according to the second embodiment of the present invention.

Specific examples thereof are described referring to FIGS. 10 and 11. FIGS. 10 and 11 are explanatory diagrams, each illustrating a specific shape of the distal end portion of the pinion gear 54 according to the second embodiment of the present invention, illustrated in FIG. 9 referred to above. For example, as illustrated in FIG. 10, the distal end portion of the pinion gear 54 may have a shape to which a gear surface 54b exclusive for synchronization having a tooth thickness smaller than that of a gear surface 54a for torque transmission is provided. Alternatively, as illustrated in FIG. 11, the distal end portion of the pinion gear 54 may have a shape to which a projecting portion 54c is provided as a projection exclusive for synchronization.

Although the pinion gear 54 illustrated in each of FIGS. 10 and 11, which has the portion exclusive for synchronization so as to enable the meshing engagement even during the rotation of the ring gear 6, is exemplified, the same structure may be provided not only to the pinion gear but also to the ring gear 6.

Third Embodiment

Figure 12:
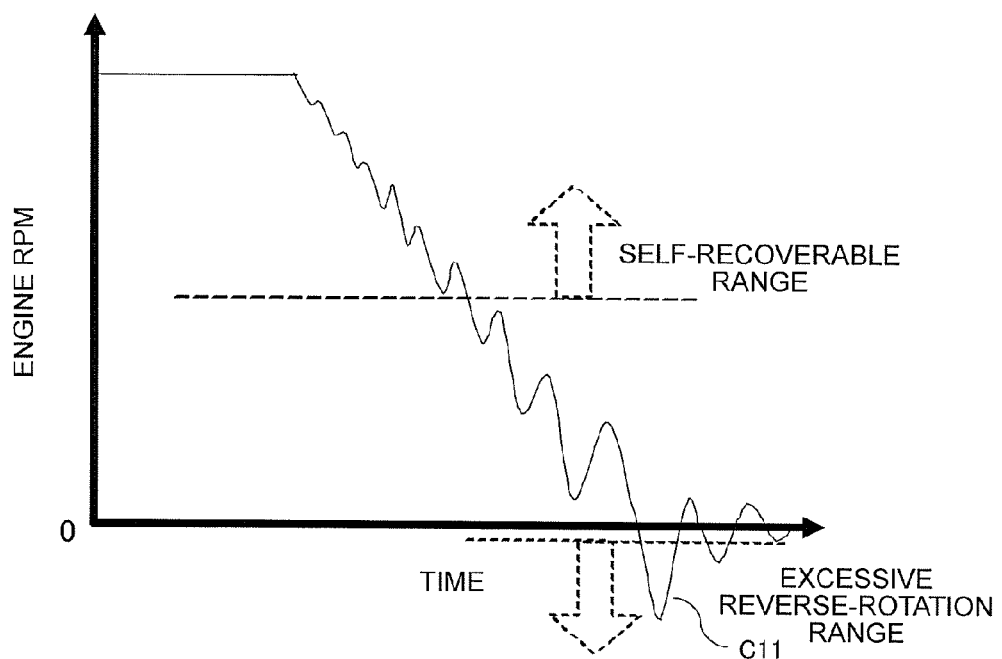
FIG. 12 A graph showing an engine reverse-rotation phenomenon when an engine stop operation is performed.

There exist the types of vehicles including the engine which rotates excessively in a reverse direction during the deceleration with pulsations. FIG. 12 is a graph showing an engine reverse-rotation phenomenon when the engine stop operation is performed. When the pinion and the ring gear are brought into meshing engagement in an excessive reverse-rotation range (corresponding to C11 in FIG. 12), the structure such as the one-way clutch 51 does not spin. Therefore, a reduction gear included in the pinion portion 5 may be damaged in some cases.

Therefore, such a case is coped with by adjusting the amount of intake air by a valve or providing a shock-absorbing clutch to the pinion portion 5 itself to avoid the damage. Even by using the same engine configuration as those of the first and second embodiments described above and changing the operation in accordance with control, however, the engine reverse-rotation phenomenon can be coped with. Therefore, in a third embodiment, the operation of the control described above is described referring to the drawings.

Figure 13:
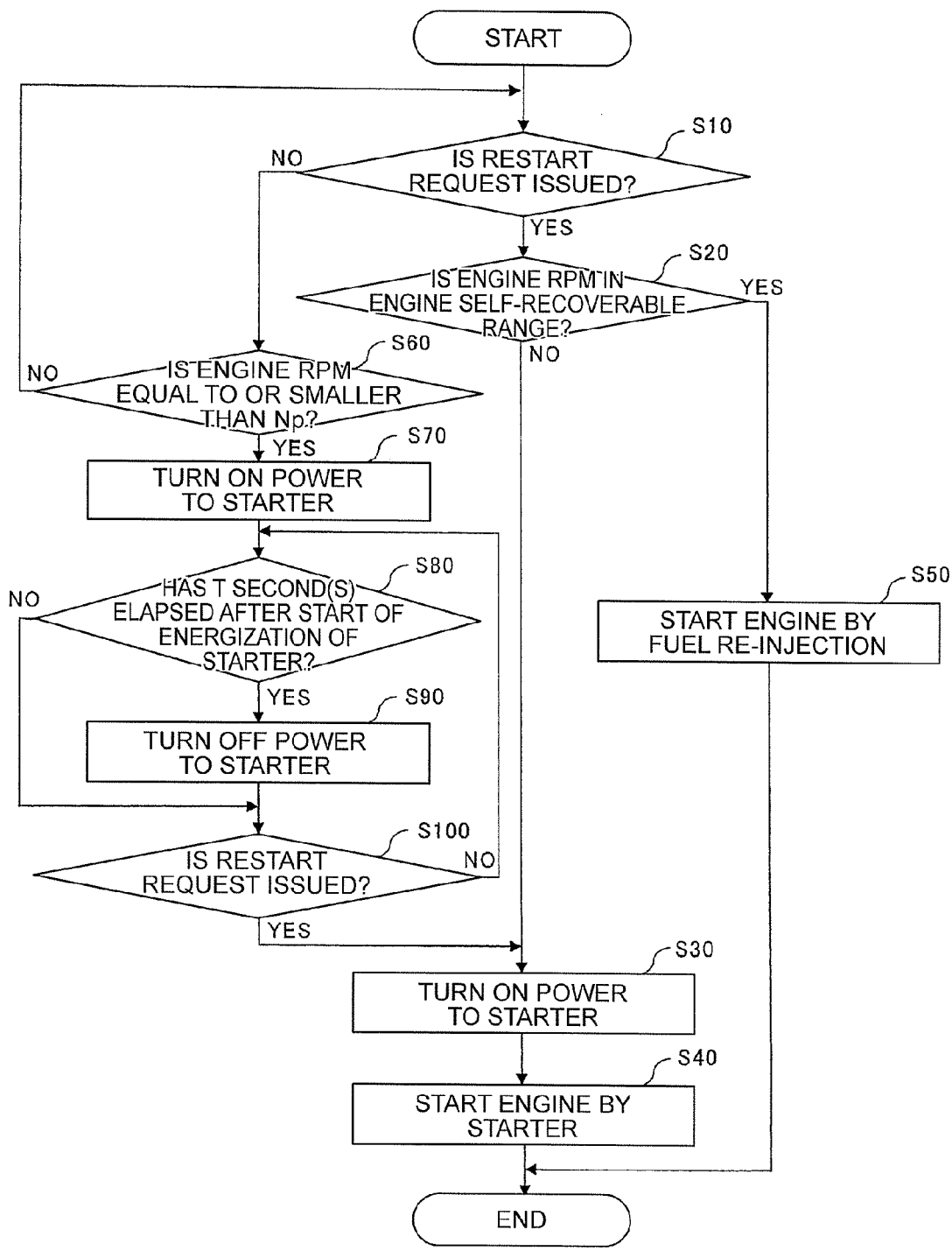
FIG. 13 A flowchart illustrating an operation series of an engine starting device according to a third embodiment of the present invention.

FIG. 13 is a flowchart illustrating an operation series of an engine starting device according to the third embodiment of the present invention. While the engine rotation is decelerating after idling is stopped, the control section included in the engine starting device is in a waiting state for the restart request (Step S10).

Then, when the restart request is issued, the control section determines whether or not the engine rpm is in the self-recoverable range, as in the case of the operation in the first embodiment described above (Step S20). When the engine rpm is in the self-recoverable range, the control section starts the engine by re-injection of the fuel (Step S50).

On the other hand, when the engine rpm is not in the self-recoverable range, the control section turns ON power to the starter 4 to restart the engine by the starter 4 (Steps S30 and S40).

In the operation according to the first embodiment described above illustrated in FIG. 2, the control section waits until the restart request is issued in Step S10. On the other hand, the operation according to the third embodiment illustrated in FIG. 13 differs in that the operation of the control section proceeds to Step S60 and subsequent steps when the restart request is not issued in Step S10. Therefore, the operation on and after Step S60 is subsequently described.

When the restart request is not issued in Step S10 in a state in which the restart request is waited for, the operation proceeds to Step S60 where the control section determines whether or not the engine rpm is equal to or smaller than a predetermined rpm Np (Step S60). In the third embodiment, as an example of a value of the engine rpm in the vicinity of 0 rpm, Np is set to 100 rpm.

In Step S60, when the engine rpm is equal to or smaller than 100 rpm in a state in which the restart request is not issued, the control section turns ON the power to the starter to push the pinion so as to bring the pinion into meshing engagement with the ring gear (Step S70).

Thereafter, the control section determines whether or not a predetermined period of time, that is, T second(s), has elapsed after the power to the starter 4 is turned ON (Step S80). When the T second(s) corresponding to the predetermined period of time has not elapsed, the operation proceeds to Step S100 where the control section determines whether or not the restart request is issued. Here, the predetermined period of time, that is, T second(s), corresponds to time from the start of pushing of the pinion to the start of the operation of the motor (specifically, time required to bring the pinion into contact with the ring gear by pushing the pinion).

On the other hand, in Step S80 described above, when the T second(s) corresponding to the predetermined period of time has elapsed, the control section turns OFF the power to the starter (Step S90). Then, the operation proceeds to Step S100 and determines whether or not the restart request is issued.

Then, when the control section determines in Step S100 that the restart request is not issued, the operation returns to Step S80 where the control section determines whether or not T second(s) corresponding to the predetermined period of time has elapsed after the start of the energization of the starter. On the other hand, when the control section determines in Step S100 that the restart request is issued, the operation proceeds to Step S30 where the power to the starter is turned ON. Further, in Step S40, the engine is restarted by the starter.

Specifically, in the third embodiment, when the restart request is not issued even after the rotation speed of the ring gear becomes equal to or smaller than the predetermined rotation speed Np subsequently to the engine stop request, the starter motor 1 is energized. Then, when the restart request is not issued until the T second(s) corresponding to the predetermined period of time required to push the pinion to bring the pinion into contact with the ring gear elapses after the start of the energization, the power to the starter motor 1 is turned OFF. Thereafter, at timing at which the restart request is issued, the energization of the starter motor 1 is restarted to restart the engine by the starter motor. On the other hand, when the restart request is issued before the elapse of the T second(s) corresponding to the predetermined period of time after the start of the energization, the starter motor 1 is continuously energized to restart the engine by the starter motor 1.

Figure 14:
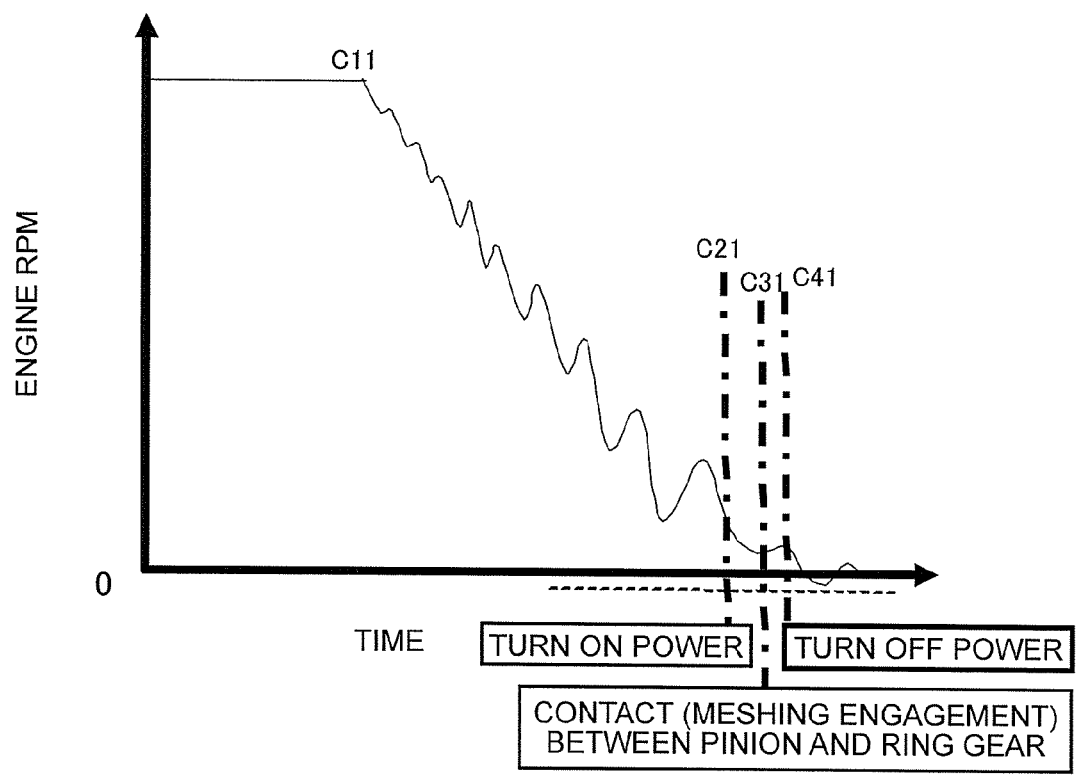
FIG. 14 A graph showing a state of an engine rpm in steps illustrated in FIG. 13, with the engine starting device according to the third embodiment of the present invention.

FIG. 14 is a graph showing a state of the engine rpm in Steps S70, S80, and S90 illustrated in FIG. 13 referred to above, with the engine starting device according to the third embodiment of the present invention. In a state in which the power to the starter is turned OFF (state in Step S90), the engine is prevented from excessively rotating in the reverse direction by the inertia of the pinion gear at time (corresponding to C31) at which the pinion and the ring gear come into contact with each other.

Therefore, the pinion and the ring gear can be brought into meshing engagement again whenever the restart request is issued. By the operation described above, there can be realized the engine starting device at low cost, which can restart the engine during the rotation of the ring gear while suppress the problem of noise even without separately controlling the operation of pushing the pinion and the rotation of the motor.

As described above, according to the third embodiment, even when the restart request is not issued, the pinion is pushed to come into contact with the ring gear before the engine starts rotating in the reverse direction in the vicinity of 0 rpm. When the restart request is not issued until the predetermined period of time by which the starter motor is not rotated or is rotating at a low speed after the start of the rotation, the power to the starter motor is turned OFF. As a result, there is provided the engine starting device capable of eliminating the excessive reverse rotation, and bringing the pinion and the ring gear into meshing engagement again whenever the restart request is issued.

Fourth Embodiment

A source of generation of noise is a sound emitted from the ring gear by the collision of the pinion. Some types of vehicles include a ring gear which is likely to generate noise. In such a case, when the rpm difference is large, discomfort is disadvantageously given at the time of restart. Therefore, a fourth embodiment describes the case where the problem of discomfort is eliminated by achieving the meshing engagement with rpm being equal to or smaller than an rpm Ng at which noise becomes lower than cranking noise.

Figure 15:
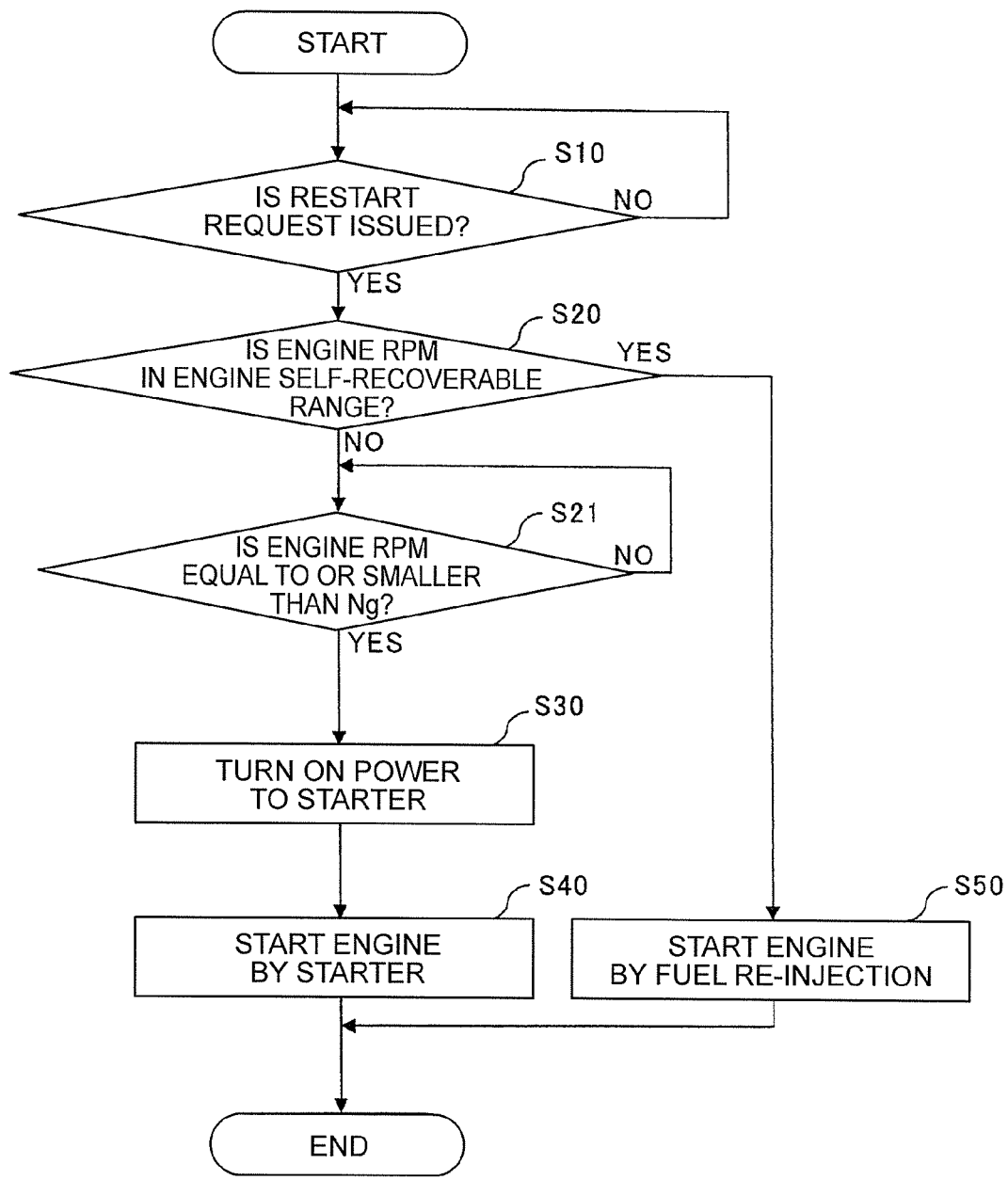
FIG. 15 A flowchart illustrating an operation series of an engine starting device according to a fourth embodiment of the present invention.

FIG. 15 is a flowchart illustrating an operation series of an engine starting device according to the fourth embodiment of the present invention. A basic structure of the engine starting device according to the fourth embodiment is the same as the configuration described above in the first embodiment, illustrated in FIG. 1.

In comparison with the flowchart of FIG. 2 according to the first embodiment described above, the flowchart of FIG. 15 according to the fourth embodiment differs in that Step S21 is further provided. Therefore, the different step is mainly described below.

In Step S20 in the fourth embodiment, when the engine rpm is not in the self-recoverable range, the operation of the control section proceeds to Step S21. Then, in Step S21, the control section determines whether or not the engine rpm is equal to or smaller than a predetermined rpm Ng. In the fourth embodiment, as an example of a value of the engine rpm in the vicinity of 0 rpm, Ng is set to 100 rpm.

In Step S21, after the control section waits until the engine rpm becomes equal to or smaller than Ng (100 rpm), the power to the starter is turned ON to restart the engine by the starter (Steps S30 and S40).

As described above, a loss is generated between the engine rpm Ng and the rpm in the self-recoverable range. However, the engine starting device with reduced cost can be realized without a significant change such as changing of the ring gear and the like.

As described above, according to the fourth embodiment, the engine is restarted by the starter after the rpm difference becomes equal to or smaller than a given value. As a result, the engine starting device without discomfort with the suppression of noise can be obtained.

In the fourth embodiment, the case where Step S21 is added to the flowchart of FIG. 2 according to the first embodiment described above has been described. However, Step S21 may be added to the flowchart of FIG. 13 according to the third embodiment described above, and the same effects can be obtained thereby.

Fifth Embodiment

In a fifth embodiment, an operation in the case where the engine cannot be restarted when the engine rpm is in the self-recoverable range in the first to fourth embodiments described above is described. A basic structure of an engine starting device according to the fifth embodiment is the same as the configuration of the first embodiment described above, which is illustrated in FIG. 1.

Figure 16:
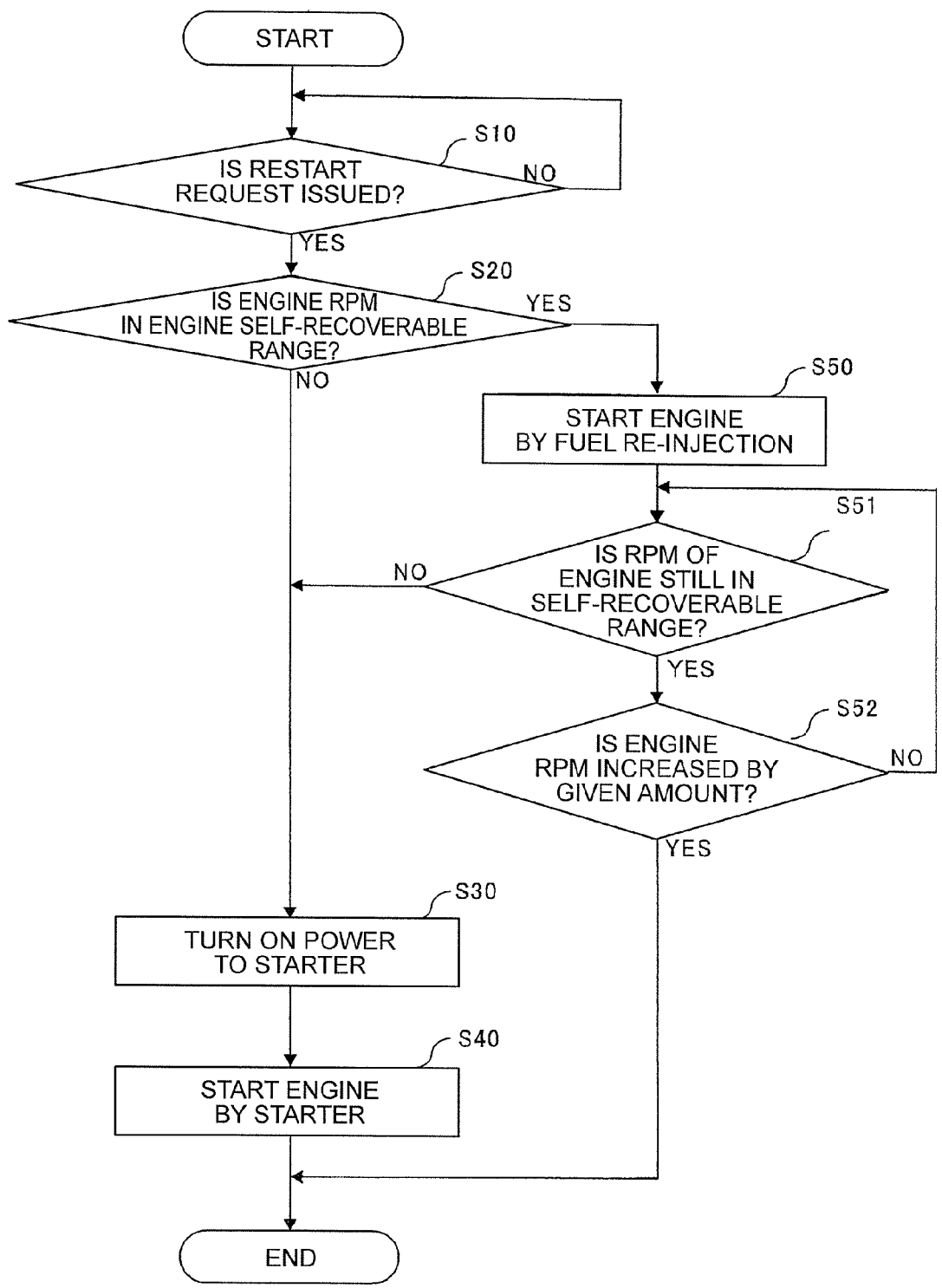
FIG. 16 A flowchart illustrating an operation series of an engine starting device according to a fifth embodiment of the present invention.

FIG. 16 is a flowchart illustrating an operation series of the engine starting device according to the fifth embodiment of the present invention. In comparison with the flowchart of FIG. 2 according to the first embodiment described above, the flowchart of FIG. 16 according to the fifth embodiment differs in that Steps S51 and S52 are further provided. Therefore, the different steps are mainly described below.

In Step S50 in the fifth embodiment, after the engine is started by re-injecting the fuel when the engine rpm is in the self-recoverable range, the operation of the control section proceeds to Step S51. Then, in Step S51, the control section determines whether or not the engine rpm is still in the self-recoverable range.

Further, when the engine rpm is maintained in the self-recoverable range, the operation of the control section proceeds to Step S52 where it is determined whether or not the engine rpm is increased by a given amount or larger. When the engine rpm is increased by the given amount or larger, it is determined that the restart is completed and the processing series is terminated. On the other hand, when the engine rpm is not increased by the given amount or larger in Step S52, the operation of the control section returns to Step S51 where it is determined whether or not the engine rpm is still in the self-recoverable range.

When the control section determines in Step S51 that the engine rpm becomes lower than the self-recoverable range, the operation of the control section proceeds to Step S30 where the power to the starter is turned ON. Further, in Step S40, the engine is restarted by the starter.

As described above, according to the fifth embodiment, even when the engine rpm is not increased to a given rpm and the self-recovery is impossible (restart cannot be performed) after the fuel is re-injected to start the engine, the engine can be restarted by performing the control to restart the engine by the starter.

The configuration described above can be applied even to the second to fourth embodiments described above. Specifically, Steps S51 and S52 are similarly provided to a part of the flowchart after the engine start by the re-injection of the fuel.

Sixth Embodiment

In the first to fifth embodiments described above, the case where the circuit configuration is as illustrated in FIG. 1 referred to above has been described as an example. Specifically, in the structure illustrated in FIG. 1, the motor 1 is not rotated unless the pinion gear is fully pushed by the coil core 4aa thorough the energization of the switch to connect the switching portion 4b. On the other hand, in a sixth embodiment, the case with a circuit configuration different from that illustrated in FIG. 1 is described.

Figure 17:
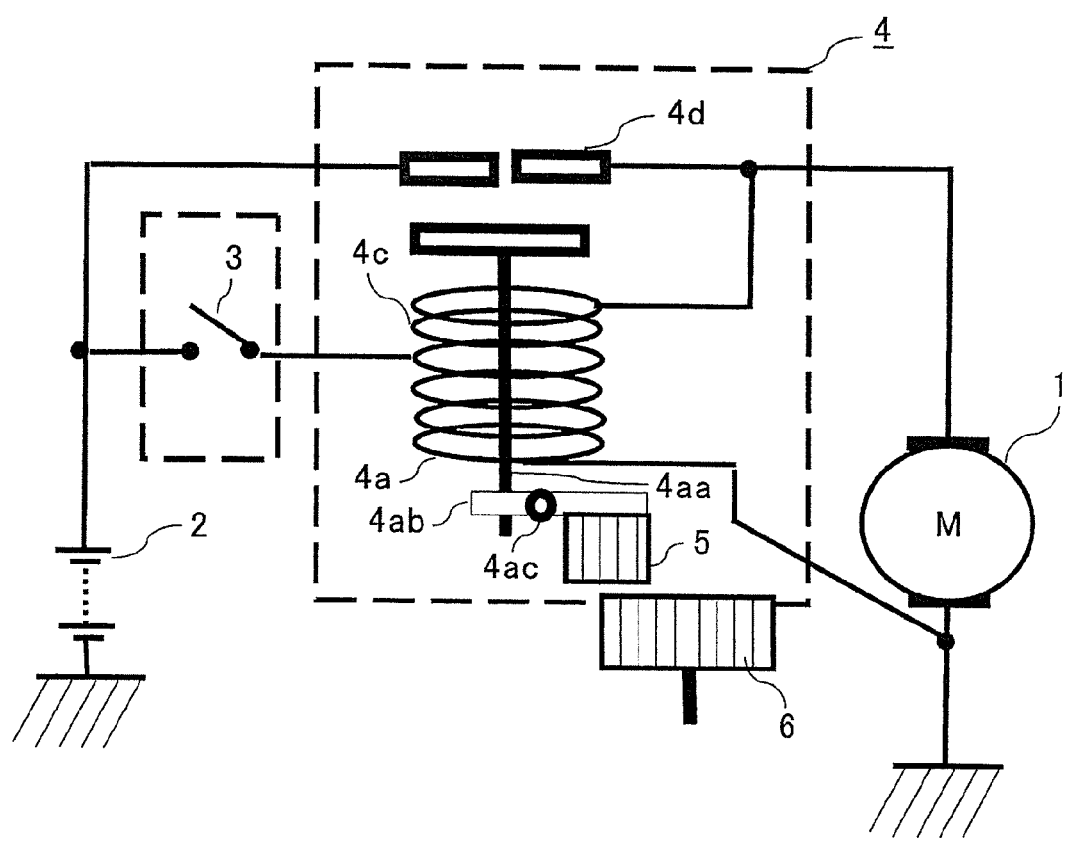
FIG. 17 A schematic diagram of an engine starting device according to a sixth embodiment of the present invention.

FIG. 17 is a schematic diagram of an engine starting device according to the sixth embodiment of the present invention. As illustrated in FIG. 17, there is provided a structure in which the motor can be energized simultaneously by the coil core 4aa for fully pushing the pinion. A circuit configuration may be such that the motor 1 rotates at a full speed when the switch is fully closed.

With the circuit configuration described above, when a current at the level which does not allow the motor 1 to rotate flows, the start of the rotation of the motor is advanced smoothly to provide the effects of advancing the restart time. Moreover, when the motor 1 rotates at a level generating no problem in meshing engagement, the pinion gear rotates to provide the effect of advancing the restart time or shifting the phases to easily achieve the meshing engagement in case of normal start.

As described above, according to the sixth embodiment, there is provided the structure in which the motor can be energized simultaneously by the coil core for fully pushing the pinion. The circuit configuration is such that the motor is rotated at a full speed when the switch is fully closed. As a result, in addition to the effects described in the first to fifth embodiments described above, the reduction in restart time and the improvement of meshing performance can be further achieved.

The invention claimed is:

1. An engine starting device for an idle-stop system for stopping an engine when an idle-stop condition is satisfied, the engine starting device comprising:
   a starter motor;
   a pinion portion which is to be spline-coupled to an output shaft side of the starter motor, and is slidable in an axial direction;
   a pushing mechanism for pushing a pinion gear of the pinion portion to a position at which the pinion gear comes into meshing engagement with a ring gear; and
   an integrated switch for operating a motor-energization switch to pull a plunger after the pinion gear is pushed, by configuring a switch for actuating the pushing mechanism and turning ON/OFF an energization current to the starter motor by a single plunger coil,
   wherein when a restart request is issued after an engine stop is requested and therefore the integrated switch is placed in an ON state, operation timing of the pushing mechanism and coil-operation timing of the plunger coil are set so that the starter motor avoids operating until the pinion gear comes into contact or meshing engagement with the ring gear; and
   the engine is restarted when a predetermined condition is satisfied even during inertial rotation of the engine,
   wherein, when the integrated switch is placed in the ON state, the pinion portion includes a distal end portion having a shape for synchronization and a one-way clutch so that the pinion gear is pushed to be brought into contact with the ring gear to synchronize the pinion gear to achieve meshing engagement on a torque-transmission surface of the pinion gear even during rotation of the ring gear, the distal end portion is provided at a distal end of the pinion gear as a surface shape exclusive for synchronization having a tooth thickness smaller than that of the torque-transmission surface.

2. An engine starting device according to claim 1, further comprising ring-gear rotation-speed detecting means for detecting a rotation speed of the ring gear, wherein:

in a case where the restart request is issued, when the rotation speed of the ring gear, which is detected by the ring-gear rotation-speed detecting means, is in a self-recoverable range of the engine, a fuel is re-injected to restart the engine for self-recovery of the engine without energizing the starter motor; and when the rotation speed of the ring gear, which is detected by the ring-gear rotation-speed detecting means, is lower than the self-recoverable range of the engine, the integrated switch is placed in the ON state to perform an operation of the pushing mechanism and a coil operation of the plunger coil to restart the engine by the starter motor.

3. An engine starting device according to claim 2, wherein, when the rotation speed of the ring gear departs from the self-recoverable range without being increased by a given amount and is lowered after the engine is restarted by re-injecting the fuel, the integrated switch is placed in the ON state to perform the operation of the pushing mechanism and the coil operation of the plunger coil to restart the engine by the starter motor.

4. An engine starting device according to claim 2, wherein, when the rotation speed of the ring gear, which is detected by the ring-gear rotation-speed detecting means, is lower than the self-recoverable range of the engine, the starter motor is energized after the rotation speed of the ring gear becomes equal to or lower than a first predetermined rotation speed.

5. An engine starting device according to 2, wherein:

in a case where the restart request fails to be issued even when the rotation speed of the ring gear becomes equal to or lower than a second predetermined rotation speed after the engine stop is requested, the starter motor is energized;

in a case where the restart request fails to be issued until a predetermined period of time required to push the pinion gear to bring the pinion gear into contact with the ring gear elapses after start of the energization, power to the starter motor is turned OFF and the energization of the starter motor is subsequently restarted at timing at which the restart request is issued to restart the engine by the starter motor; and in a case where the restart request is issued before the predetermined period of time elapses after the start of the energization, the energization of the starter is continued to restart the engine by the starter motor.

6. An engine starting device according to claim 5, wherein the second predetermined speed comprises a rotation speed of from 100 rpm to 0 rpm.

7. An engine starting device according to claim wherein the pinion portion includes a pinion gear exclusive for synchronization for meshing engagement, which has the distal end having the shape for synchronization, and a pinion gear for torque transmission after meshing engagement, which are provided individually.

8. An engine starting device according to claim 1, wherein the engine starting device has a circuit configuration in which the starter motor is energizable simultaneously or with a time delay when the integrated switch is placed in the ON state by a current at a level which avoids allowing the starter motor to rotate or a current at a level which avoids allowing the starter motor to rotate at a full speed.

* * * * *